United States Patent
Chefd'hotel et al.

(10) Patent No.: US 7,706,633 B2
(45) Date of Patent: Apr. 27, 2010

(54) GPU-BASED IMAGE MANIPULATION METHOD FOR REGISTRATION APPLICATIONS

(75) Inventors: Christophe Chefd'hotel, Jersey City, NJ (US); Razvan Chisu, Garching, DE (US); Bernhard Geiger, Cranbury, NJ (US); Jens Guehring, Monmouth Junction, NJ (US); Ali Kamen, Princeton, NJ (US); Sebastian Vogt, Lawrenceville, NJ (US); Wolfgang Wein, Princeton, NJ (US)

(73) Assignee: Siemens Corporation, Iselin, NJ (US)

( * ) Notice: Subject to any disclaimer, the term of this patent is extended or adjusted under 35 U.S.C. 154(b) by 967 days.

(21) Appl. No.: 11/109,126

(22) Filed: Apr. 19, 2005

(65) Prior Publication Data

US 2005/0271302 A1 Dec. 8, 2005

Related U.S. Application Data

(60) Provisional application No. 60/564,148, filed on Apr. 21, 2004.

(51) Int. Cl.
*G06K 9/32* (2006.01)
*G06K 9/00* (2006.01)
*G09G 5/00* (2006.01)

(52) U.S. Cl. .................. 382/294; 382/128; 345/648

(58) Field of Classification Search .................. 382/294
See application file for complete search history.

(56) References Cited

U.S. PATENT DOCUMENTS

| | | | | |
|---|---|---|---|---|
| 5,164,997 A | * | 11/1992 | Kumagai | 382/294 |
| 5,633,951 A | * | 5/1997 | Moshfeghi | 382/154 |
| 5,760,914 A | * | 6/1998 | Gauthier et al. | 382/293 |
| 6,738,532 B1 | * | 5/2004 | Oldroyd | 382/294 |
| 6,862,027 B2 | * | 3/2005 | Andrews et al. | 345/505 |
| 7,062,419 B2 | * | 6/2006 | Grzeszczuk et al. | 703/2 |
| 2004/0169650 A1 | * | 9/2004 | Bastos et al. | 345/426 |
| 2005/0238257 A1 | * | 10/2005 | Kaneda et al. | 382/305 |

OTHER PUBLICATIONS

Krüger et al., "Linear Algebra Operators for GPU Implementation of Numerical Algorithms", SIGGRAPH, 2003, pp. 1-9.*
Penney et al., "A Comparison of Similarity Measures for Use in 2D-3D Medical Image Registration", IEEE Transactions on Medical Imaging, vol. 17, No. 4, Aug. 1998, pp. 586-595.*
Fernando et al., "Programming Graphics Hardware", EuroGraphics, 2004, pp. 1-17.*
Heather et al., "Multimodal Image Registration wih Applications to Image Fusion", 2005 7th International Conference on Information Fusion (FUSION), pp. 372-379.*
Razvan Chisu, "Technique for Accelerating Intensity-Based Rigid Image Registration", Jan. 15, 2005, pp. 1-84.
United States Patent Application entitled: "System and Method for GPU-Based 3D Nonrigid Registration", U.S. Appl. No. 11/062,962, filed Feb. 22, 2005.

* cited by examiner

*Primary Examiner*—Anand Bhatnagar
*Assistant Examiner*—Jose M Torres

(57) ABSTRACT

Exemplary systems and methods for performing registration applications are provided. An exemplary system includes a central processing unit (CPU) for transferring a plurality of images to a graphics processing unit (GPU); wherein the GPU performs a registration application on the plurality of images to produce a registration result, and wherein the GPU returns the registration result to the CPU. An exemplary method includes the steps of transferring a plurality of images from a central processing unit (CPU) to a graphics processing unit (GPU); performing a registration application on the plurality of images using the GPU; transferring the result of the step of performing from the GPU to CPU.

20 Claims, 5 Drawing Sheets

GPU-BASED IMAGE MANIPULATION METHOD FOR REGISTRATION APPLICATIONS

CROSS-REFERENCE TO RELATED APPLICATIONS

This application claims priority to U.S. Provisional Application No. 60/564,148, which was filed on Apr. 21, 2004, and which is fully incorporated herein by reference.

BACKGROUND OF THE INVENTION

1. Field of the Invention

The present invention relates generally to the field of processor-based imaging, and, more particularly, to optimizing image operations in registration applications using GPUs.

2. Description of the Related Art

Medical imaging has become a vital component for numerous medical applications, ranging from diagnostics and planning to consummation and evaluation of surgical and radiotherapeutical procedures. A vast number of imaging modalities are currently used, including two-dimensional modalities (e.g., x-ray, angiography and ultrasound ("US")) and three-dimensional modalities (e.g., computed tomography ("CT"), magnetic resonance tomography ("MRT") and positron emission tomography ("PET")).

Medical professionals often acquire more than one image of a patient at different points of time and/or by means of different imaging modalities. The variety of images often provide complementary information. Thus, it is generally desirable to merge the data from the various images. This is known as data fusion. Data fusion may provide the physician with more information than if the physician analyzed each image by itself. Further, data fusion may exploit the available data to a maximum degree, thereby reducing the overall number of images needed to be acquired and potentially lowering operating costs for a medical provider and inconveniences (e.g., exposure to radiation) for a patient. The first step of data fusion is typically registration, which refers to the process of bringing different images into spatial alignment.

Digital medical images, especially three-dimensional volumetric data, can easily reach hundreds of megabytes in size (say 500 slices of 512×512 images with 16-bit pixels equals 260 MB). Therefore, the registration of digital medical images can be computationally quite expensive.

SUMMARY OF THE INVENTION

In one aspect of the present invention, a system for performing registration applications is provided. The system includes a central processing unit (CPU) for transferring a plurality of images to a graphics processing unit (GPU); wherein the GPU performs a registration application on the plurality of images to produce a registration result, and wherein the GPU returns the registration result to the CPU.

In another aspect of the present invention, a method for registering images is provided. The method includes the steps of transferring a plurality of images from a central processing unit (CPU) to a graphics processing unit (GPU); performing a registration application on the plurality of images using the GPU; transferring the result of the step of performing from the GPU to CPU.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF PREFERRED EMBODIMENTS

Figure 1:
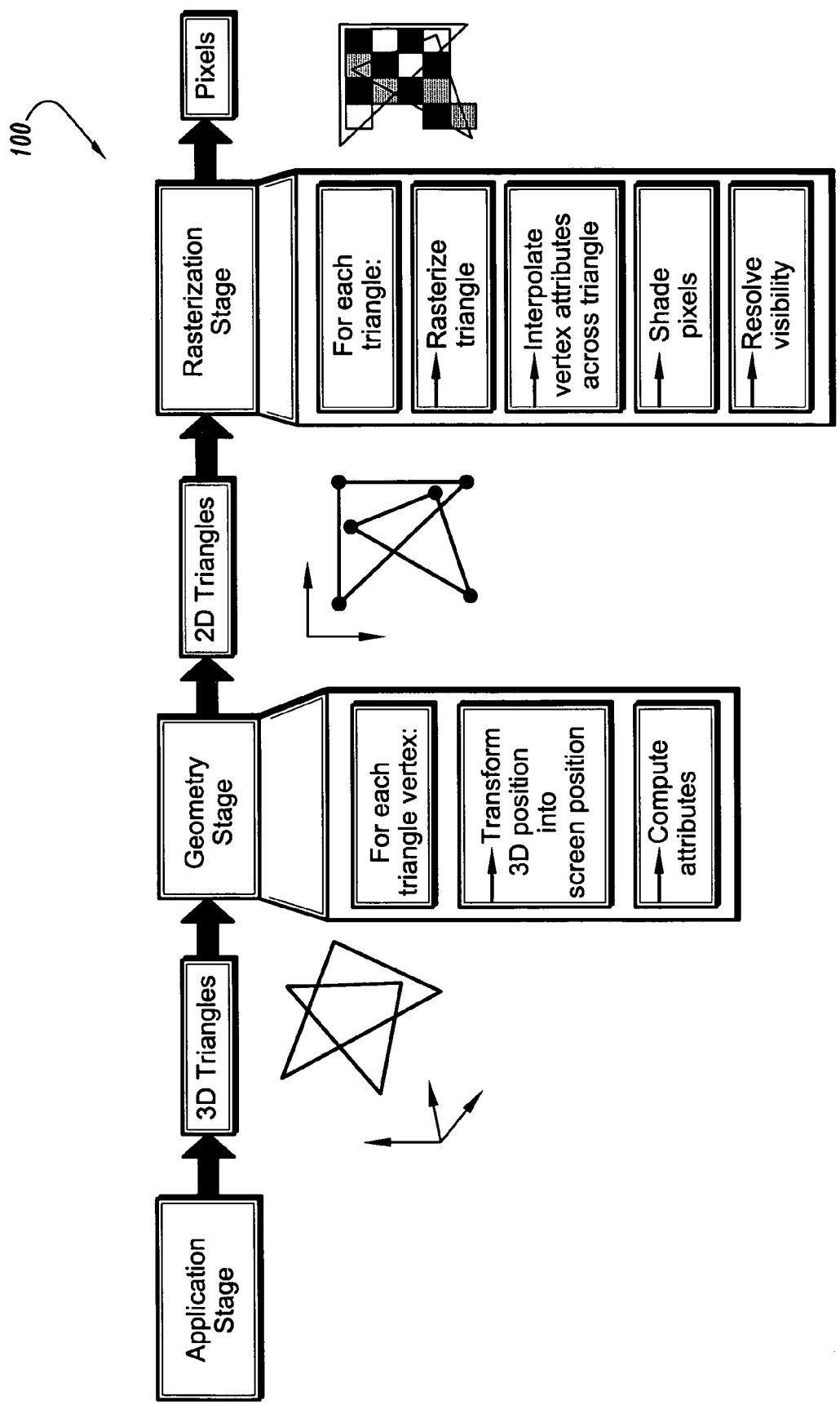
FIG. 1 depicts an exemplary rendering pipeline of a GPU.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It is to be understood that the systems and methods described herein may be implemented in-various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

We propose using graphics processing units ("GPUs") typically found in graphics cards for performing registration applications. Registration applications include, but are not limited to, warping, local histogram computations, intensity corrections, and similarity measure computations. The computational performance offered by today's video boards by far surpasses that of currently available CPUs. This fact, together with the inherently parallel architecture of graphics processors, has made the possibility of utilizing GPU programming highly attractive for accelerating processes in various domains. However, because graphics processors are designed for carrying out very special kinds of calculations, as opposed to the multi-purpose intended CPUs, GPUs typically cannot perform registration applications in the same manner as CPUs. Therefore, additional functionality is added to the GPUs so that the GPUs can perform registration applications.

Image Registration

A comprehensible classification of the entire registration problem has been proposed based on nine main criteria, which include image dimensionality, the nature of the registration basis, the nature and domain of the transformation, user interaction, optimization procedures, the involved imaging modalities, the subject and the object.

Nearly every application of image registration requires the establishment of a spatial correspondence between the respective data sets. In other words, registration typically involves finding a spatial transformation that relates structures in one image to the corresponding structures in another image. The nature of these transformations can be classified by the dimensionality of the images to be registered and the number of parameters, or degrees of freedom, to be computed.

Depending on the imaging sensor, the acquired data can be two, three or four-dimensional (three dimensions in space plus time as the fourth), so we can distinguish between the following:

(1) 2D-to-2D Registration

In the most simple of cases, two 2D images can be registered by determining the translation along the two axes and the rotation angle. However, clinically relevant applications of this case are rare, since changes in the geometry of image acquisition over time or from one imaging sensor to another introduce additional degrees of freedom.

(2) 2D-to-3D Registration

This case arises when a correspondence between a projection image like X-ray and a volumetric data set like CT must be established. A typical application of this would be relating an intra-operative 2D image to a preoperative 3D image for the purpose of image-aided surgery or radiotherapy. The matching of such data sets yields ten degrees of freedom. Four of them determine the projective transformation for the 2D image and can therefore be determined in advance by correct calibration, leaving six parameters for the volume's translation and rotation along the three axes. Since most of the 2D-to-3D applications concern intra-operative scenarios, they are heavily time-constrained and have a strong focus on speed issues concerning the computation of the spatial pose.

(3) 3D-to-3D Registration

The registration of two volumes, is the most well developed process and a widely used method. The positions of two rigid bodies can always be related to one another by means of three translations and three rotations, but the particular conditions of imaging might impose further degrees of freedom to account for different scaling of voxels, a tilt in the gantry or a general affine transformation which is determined by twelve parameters.

(4) Registration of Time Series

Time series of images are acquired for various reasons and at various intervals. Applications include monitoring of tumor growth, post-operative monitoring of the healing process or observing the passing of injected bolus through a vessel tree. Subsequent registration of such an image series can be used to study dynamic processes such as blood flow or metabolic processes.

Depending on the organs and anatomical structures which are of interest, registration can be divided into rigid registration (i.e., the registration of rigid structures like bone) and deformable registration (i.e., the registration of deformable structures like soft tissue). Deformable registration adds a theoretically unlimited number of degrees of freedom to the ones named above. To make registration possible, several restrictions can be applied to the deformation based upon the physics of tissue transformation or general mathematical models.

The Registration Process

To spatially align two images, various registration methods basically try out different poses, starting from an initial estimate, and computing some kind of image similarity measure for each pose, repeating this process until an optimal alignment is found.

In the case where the images to be registered are of different dimensionality (e.g., 2D-3D registration), there also appears the need for generating a two-dimensional image from the volume to allow the assessment of image similarity. The points in two-dimensional X-ray images correspond to the line integral of the gamma radiation attenuation along the corresponding line from radiation source to detector. As such, X-ray images represent a projection of the three-dimensional physical space, which can be simulated from a corresponding CT volume by applying a perspective projective transformation to it, using the intrinsic parameters of the X-ray imaging device. This simulation of X-ray images from CT volumes yields a so-called Digitally Reconstructed Radiograph (DRR), which can then be compared to the original X-ray image. Other imaging modalities, such as ultrasound, do not represent a projective transformation of the physical reality, so the process of generating a corresponding 2D image from the 3D data set must be adapted accordingly. The similarity of the two 2D images can then be used to iteratively determine better estimates for the parameters describing the 3D-to-2D transformation applied to the volume data, usually the volume's rotation and translation along the three axes in the case of rigid transformations.

3D-3D registration can be performed in two ways. In a first method, the volumes can be aligned directly by computing a volumetric similarity measure that examines the voxel intensities. Although this approach may be very straightforward, the number of computations for each pose is very high, resulting in a very slow registration process.

Another possibility is to use orthographic projections of the volume data along the three-coordinate axes and register the volumes by repeatedly aligning the two-dimensional images. Although this second method introduces the cost of generating projections from the volumes, the significantly reduced number of intensity values analyzed for assessing the similarity measure results in a much better performance. One may choose to perform a predefined number of 2D-2D registrations or repeat the process until the images' similarity has reached a certain threshold.

In effect, the registration process works as follows:
1. The process starts with the two 2D/3D or 3D/3D images, an initial estimate for the spatial alignment, which is set by the user, and, if required, the parameters needed for generating two-dimensional images from the volume data (e.g., the parameters for the perspective projection in the case of X-ray-to-CT registration or those for the orthographic projection in the case of 3D-3D registration).
2. The one or two required projections are computed from the volumetric data set(s). This process is known as volume rendering and can be significantly accelerated by using modern graphics processors, which implement volume rendering as standard functionality.

3. The alignment of the two images (of same dimensionality) can now be estimated by computing a similarity measure. A variety of such measures exist, which will be summarized below.

4. This estimated alignment value can then be used by an optimization algorithm as a cost function. By repeating steps 2-4, the algorithm attempts to find the global optimum in the parameter space, thereby determining the best alignment of the two images. Various abortion parameters (e.g., number of iterations or the size of the steps taken in the parameter space) can be used to define when the process terminates.

Intensity-Based Similarity Measures

Determining how similar two images are is a key problem in the registration process because it indicates to what degree the images are aligned. Two main approaches for determining a measure of similarity exist, namely intensity-based and feature-based measures.

Feature-based measures take into account different shapes or structures in the two images, like points, curves or surfaces. These shapes can be markers placed inside or on the patient's body as well as anatomical elements like bones. Obviously, those objects must be identified before the actual similarity can be computed. Because feature extraction (i.e., segmentation) methods usually require some user interaction, they are typically not a good choice for fully automatic registration. Still, it should be noted that these methods are usually very fast, once the segmentation has been completed, because they operate on a reduced set of information.

Intensity-based measures, on the other hand, only operate on the pixel or voxel values. Intensity-based measures do not require user interaction in identifying any landmarks or in supervising a segmentation method. Although this approach is slower than the feature-based one because it takes the complete image data into account (which can reach hundreds of megabytes for high-resolution volumes), it can be accelerated by defining a region of interest ("ROI"), disregarding the pixels (or voxels) outside of the ROI when computing the similarity measure and when generating the DRRs. Apart from speeding up the registration, the use of a ROI can also lead to a more accurate registration of the anatomical features the physician is interested in because other, possibly deformable and thereby non-matching, elements can be ignored.

Intensity-based similarity measures can further be classified as measures using only image intensities, measures using spatial information (i.e., intensities in a voxel's neighborhood) and histogram-based measures.

Measures Using Only Image Intensities

The most simple type of similarity measures only regards pairs of intensity values at the same pixel positions in the two images. The mathematical scheme by which this per-pixel similarity is being computed can be chosen with respect to the application's characteristics.

One of the simplest measures is the sum of squared intensity differences ("SSD") between two images:

$$SSD = \frac{1}{N} \sum_{x,y \in T} (I_1(x, y) - I_2(x, y))^2$$

where T is the images' overlapping domain including N voxels and $I_1(x,y)$ and $I_2(x,y)$ are the voxel intensities at the (x,y) coordinate in each image.

It can be assumed that SSD is the optimum measure when two images differ only in gaussian noise. This assumption does not apply for inter-modality registration and almost never applies for intra-modality registration because occurring noise is rarely gaussian. Furthermore, changes in the imaged objects from one scan to another scan further reduce the applicability of this assumption. SSD is also very sensitive to a small number of pixel pairs with high intensity differences, which can be caused by instruments or contrast visible in only one of the images. The sum of absolute intensity differences ("SAD") is less sensitive to such outliers:

$$SAD = \frac{1}{N} \sum_{x,y \in T} |I_1(x, y) - I_2(x, y)|$$

IF the assumption that registered images differ only by gaussian noise is replaced with a less restrictive assumption, namely that there is a linear relationship between two images, the Correlation Coefficient ("CC"), which is sometimes referred to as normalized cross correlation ("NCC") refers to the following:

$$NCC = \frac{\sum_{x,y \in T} (I_1(x, y) - \bar{I}_1) \cdot (I_2(x, y) - \bar{I}_2)}{\sqrt{\sum_{x,y \in T} (I_1(x, y) - \bar{I}_1)^2} \cdot \sqrt{\sum_{x,y \in T} (I_2(x, y) - \bar{I}_2)^2}}$$

where $\bar{I}_1$ and $\bar{I}_2$ are the mean intensities of the two images. The formula above will be hereafter referred to as the first NCC formula.

Using the first NCC formula, the method will have to run through the image data twice: once for computing the mean intensity and once for computing the correlation coefficient itself. The first NCC formula can be rewritten to require only one reading pass:

$$NCC = \frac{\sum_{x,y \in T} I_1(x, y) \cdot I_2(x, y) - n\bar{I}_1\bar{I}_2}{\sqrt{\sum_{x,y \in T} I_1(x, y)^2 - n\bar{I}_1^2} \cdot \sqrt{\sum_{x,y \in T} I_2(x, y)^2 - n\bar{I}_2^2}}$$

The above formula is hereafter referred to as the second NCC formula.

The ratio image uniformity ("RIU") measure (also known as variance of intensity ("VIR")) first generates a ratio image from the two medical images by dividing pixel intensities at corresponding coordinates. The uniformity of this ratio image is then computed as being its standard deviation divided by its mean intensity, thereby providing a normalized cost function which is independent of global intensity scaling of the original images.

To make the method unbiased with regard to which image intensities are chosen as dividend and which are chose as divisor, the ratio is inverted, and the measure is computed again. The final result is then the average of the two steps.

$$RIU = \frac{1}{2} \cdot \left( \frac{\sqrt{\frac{1}{N}\sum (R_1(x,y) - \overline{R_1})^2}}{\overline{R_1}} + \frac{\sqrt{\frac{1}{N}\sum (R_2(x,y) - \overline{R_2})^2}}{\overline{R_2}} \right)$$

with $$R_1(x,y) = \frac{I_1(x,y)}{I_2(x,y)}, R_2(x,y) = \frac{I_2(x,y)}{I_1(x,y)}$$

As for the Correlation Coefficient, this formula can also be expanded to allow for computation without having to run through the images twice.

$$RIU = \frac{1}{2} \cdot \left( \frac{\sqrt{\frac{1}{N}\sum (R_1(x,y) - N\overline{R_1})^2}}{\overline{R_1}} + \frac{\sqrt{\frac{1}{N}\sum (R_2(x,y) - N\overline{R_2})^2}}{\overline{R_2}} \right)$$

Obviously, one must decide how to handle values of zero. In one embodiment, the input intensity range is mapped to an interval excluding zero values. For example, the intensities may be transformed from the original [0%-100%] range to a [5%-95%] range.

Measures Using Spatial Information

Instead of regarding only the intensity values at a certain coordinate position, a measure using spatial information also considers each pixel's neighborhood when computing the per-pixel similarity. The method can thus operate on either the original image intensities and sum up the differences in a certain radius around the current position or first compute the gradient images and then compare them either with a pixel-based or a neighborhood-based scheme. Gradient-based measures have the advantage of being quite insensitive to low spatial frequency differences, which can be caused by soft-tissue deformation. Taking into account only edge information intuitively also seems reasonable when trying to register two images.

The pattern intensity ("PI") measure examines the contents of a difference image, starting from the assumption that the number of patterns, or structures, in this difference image will be the lowest when the optimal alignment has been found. A voxel is belong to a structure if it has a significantly different intensity value from its neighboring voxel. With r being the radius of the neighborhood and σ being a weighting constant, the pattern intensity is computed as follows:

$$PI_{r,\sigma} = \sum_{x,y \in T} \sum_{d^2 < r^2} \frac{\sigma^2}{\sigma^2 + (I_{diff}(x,y) - I_{diff}(v,w))^2}$$

$$d^2 = (x-v)^2 + (y-w)^2$$

$$I_{diff} = I_1 - s \cdot I_2$$

For $I_{diff}$, a scaling constant s can be used to reduce the contrast of the resulting difference image. A good choice for r and σ seem to be 3 and 10, although one may consider increasing the neighborhood radius to 5 to increase the measure's robustness.

Because PI evaluates differences in the difference image, a constant intensity shift in the original data sets does not influence the result.

The gradient correlation ("GC") method computes the correlation coefficients, described above, for the horizontal and vertical gradient image pairs. The final measure of similarity is then the average of these two values.

$$GC = \frac{1}{2} \cdot \frac{\sum_{x,y \in T}(I_{1H}(x,y) - \overline{I_{1H}}) \cdot (I_{2H}(x,y) - \overline{I_{2H}})}{\sqrt{\sum_{x,y \in T}(I_{1H}(x,y) - \overline{I_{1H}})^2 \cdot \sum_{x,y \in T}(I_{2H}(x,y) - \overline{I_{2H}})^2}} +$$

$$\frac{\sum_{x,y \in T}(I_{1V}(x,y) - \overline{I_{1V}}) \cdot (I_{2V}(x,y) - \overline{I_{2V}})}{\sqrt{\sum_{x,y \in T}(I_{1V}(x,y) - \overline{I_{1V}})^2 \cdot \sum_{x,y \in T}(I_{2V}(x,y) - \overline{I_{2V}})^2}}$$

The Gradient Difference ("GD") examines two difference images obtained from subtracting the vertical and horizontal gradients of the two original images. By applying a $1/(1+x^2)$ scheme to the result, this measure should be quite robust to outliers. That two images are being analyzed allows this measure to compare both direction and magnitude of the gradients $$GD = \sum_{x,y \in T} \frac{A_v}{A_v + (I_{diffV}(x,y))^2} + \sum_{x,y \in T} \frac{A_h}{A_h + (I_{diffH}(x,y))^2}$$

with $$I_{diffV}(x,y) = \frac{dI_1}{dx} - s \cdot \frac{dI_2}{dx}, I_{diffH}(x,y) = \frac{dI_1}{dy} - s \cdot \frac{dI_2}{dy}$$

and $A_v$ and $A_h$ as normalization constants, which seem to work well if set to the variance of the respective image.

Although normalized cross correlation is invariant to linear changes in image intensity, in practice there can also arise the case of spatially varying intensity distortions. This effect can appear due to vignetting and non-uniformity in the imager response, and can have a significant impact on the registration accuracy of the Correlation Coefficient method. Therefore, a modification of the original algorithm has been proposed which overcomes this problem.

The sum of local normalized correlation ("SLNC") evaluates the correlation coefficient of many small image regions. These image regions can be chosen to be non-overlapping or overlapping, up to the point where the NCC will be computed in each voxel for a small image area centered around the respective voxel.

$$SLNC(I_1, I_2) = \frac{1}{|Q|} \sum_{p \in Q} CC(I_0, I_1, P(p)),$$

where Q is a set of voxel locations which span the data set for which the SLNC is to be computed, and P(p) stands for the neighborhood of point p (i.e., the sub-image for which the NCC is assessed). The sum is then divided by the number of points in set Q (i.e., the number of sub-images) to obtain a result between −1 and 1. For example, sub-images of 7×7 and 11×11 pixels have been used.

Some of these small images might have a constant intensity over all pixels, which makes the numerator of the CC formula zero, yielding an undefined result. If the images to be registered are of the same modality, the correlation coefficient can arbitrarily be assigned a value of zero.

In the case of 2D-3D registration, however, this method cannot be used anymore, because the number, size and position of the constant patches will usually change with each DRR generation. Assigning zero values in this case would lead to discontinuities in the similarity measure. This is avoided by adding small magnitude gaussian noise to each DRR.

SLNC can further be improved by weighting the individual correlation coefficients with the variance of the respective sub-image in one of the two original images (which is termed the "control image"). Variance-weighted sum of local normalized correlation ("VWC") attributes more importance to high-frequency image areas, which contain more information about the structures to be registered, and less to low-frequency areas.

$$VWC(I_1, I_2) = \frac{1}{|Q|} \sum_{p \in Q} \text{Var}(I_1) CC(I_0, I_1, P(p))$$

$$= \frac{1}{|Q|} \sum_{p \in Q} \frac{\sum_{p \in Q}(I_1(x,y) - \bar{I}_1)^2}{n} \cdot$$

$$\frac{\sum_{x,y \in T}(I_1(x,y) - \bar{I}_1) \cdot (I_2(x,y) - \bar{I}_2)}{\sqrt{\sum_{x,y \in T}(I_1(x,y) - \bar{I}_1)^2} \cdot \sqrt{\sum_{x,y \in T}(I_2(x,y) - \bar{I}_2)^2}}$$

$$\sqrt{\sum_{p \in Q}(I_1(x,y) - \bar{I}_1)^2} \cdot$$

$$= \frac{1}{|Q|} \sum_{p \in Q} \frac{\sum_{x,y \in T}(I_1(x,y) - \bar{I}_1) \cdot (I_2(x,y) - \bar{I}_2)}{n \cdot \sum_{p \in Q}(I_2(x,y) - \bar{I}_2)^2}$$

where $C(I_1, I_2, P(p))$ computes the variance of the control image in the neighborhood $P(p)$. Additionally, VWC does not simply compute the mean of the weighted sum of correlation coefficients, but a weighted average.

Information Theoretic Measures

Registration can be thought of as trying to maximize the amount of information shared between two images, or trying to minimize the amount of information present in the combined image. When the two images are perfectly aligned, all the corresponding structures will overlap, eliminating any duplicate elements that result from misalignment. Thus, registration works based upon a measure of information. The most commonly used measure of information is the Shannon-Wiener entropy, developed as part of communication theory (however, it should be noted that a different entropy concept has been proposed which eliminates some drawbacks present in Shannon's approach):

$$H = -\sum_i p(i) \log p(i)$$

H represents the average amount of information supplied by a set of i symbols with their respective probabilities $p(1)$, $p(2)$, . . . , $p(i)$. H reaches its maximum value when all probabilities are equal (i.e., $p_i = 1/n$), so any change in the data that tends to equalize the probabilities of the different symbols increases the entropy.

The distribution of the probabilities $p_i$ can be represented as a histogram. In the case of digital images, histograms indicate the probability for a pixel to have a certain intensity (i.e., the number of pixels having a certain intensity divided by the total number of pixels). Similarly, joint probability distributions are computed by counting the occurrences of pairs of intensities (a,b) (i.e., the number of pixel positions (x,y) where $I_1(x,y)=a \wedge I_2(x,y)=b$, which generates a two-dimensional histogram—also known as a joint histogram).

The most straightforward information theoretic approach for assessing image similarity is computing the entropy of a difference image $I_{diff}=I_1-s \cdot I_2$. If the images are matching perfectly, the difference image will have a constant intensity i (i.e., $p(i)=1$ and $p(j)=0 \forall j \neq i$, which results in an entropy of zero.

The joint entropy measures the amount of information present in a combination of two images:

$$H(I_1, I_2) = \sum_i \sum_j p(i,j) \log p(i,j)$$

with i and j belonging to the intensity range of the two data sets and $p(i,j)$ being the probability distribution function which can be visualized as a joint histogram as described above. If $I_1$ and $I_2$ are completely unrelated, $p(i,j)=p(i) \vee p(i,j)=p(j) \forall (i,j)$, so $H(I_1,I_2)=\Sigma_i p(i) \log p(i) + \Sigma_j p(j) \log p(j) = H(I_1) + H(I_2)$. With increasingly similar images, the amount of information in the combined image (i.e., the value of the joint entropy) decreases until, for identical images, the combined image contains just as much information as each individual image (i.e., $H(I_1,I_2)=H(I_1)=H(I_2)$). The idea behind mutual information is now to combine the calculation of the individual and the joint entropies:

$$MI = H(I_1) + H(I_2) - H(I_1, I_2) = \sum_{i,j} p(i,j) \log \frac{p(i,j)}{p_1(i) p_2(j)}$$

In the case where $I_1$ and $I_2$ are completely unrelated, MI reaches its minimum value of 0. For identical images, $H(I_1, I_2)=H(I_1)$, so $MI=H(I_2) \leq \log n$, where n is the number of histogram bins. If normalization is desired, which usually is the case, the following scheme can be used:

$$MI' = \frac{2MI}{H(I_1) + H(I_2)} = 2 - \frac{2H(I_1, I_2)}{H(I_1) + H(I_2)}$$

Alternatively, MI can be normalized by using the ratio between the individual and the joint entropies rather than their difference:

$$MI'' = \frac{H(I_1) + H(I_2)}{H(I_1, I_2)} = \frac{1}{MI' - 2}$$

Mutual Information assumes only a statistical dependency between the intensities in the two images, but no functional one. This property has made MI a very popular measure, especially in the case of inter-modality registration, because images that provide the same information are found to be identical independently of the way in which they represent the information (i.e., on the correspondence between tissue types and intensity ranges).

GPU-Based Acceleration

Graphics cards/boards provide the ability to perform computations necessary for the rendering of 3D images (e.g., shading, lighting, texturing) directly on its GPU, thereby leaving the system's central processing unit ("CPU") available for other tasks. With a large 3D-gaming community demanding ever increasing frame rates and more sophisticated visual effects, off-the-shelf graphics hardware has evolved at a rate much higher than dictated by Moore's law over the past few years, reaching the point of GPUs having five or more times as many transistors as the fastest consumer-level CPU, executing almost seven times as many floating point operations per second and working with an internal memory bandwidth of over 35 GB/s. Some graphics hardware even offers a programmable rendering pipeline, allowing an application developer to load and execute custom programs on the GPU. While primarily intended to allow for a larger range of visual effects, the programmable rendering pipeline also allows for virtually any kind of application to take advantage of the GPU.

The role of the GPU primarily includes displaying geometrical shapes (together with appropriate lighting, shading and other effects) on the screen or a certain area of the scream (i.e., a window). To achieve this, the data describing the visual scene runs through the so-called rendering pipeline of a GPU. Referring now to FIG. 1, the rendering pipeline 100 has several stages dealing with certain aspects of the rendering process. Referring now to FIG. 1, as a first step (i.e., application stage → geometry stage), the three-dimensional geometric data, which is usually made up of triangles, is converted into two-dimensional shapes using either an orthogonal or a projective transformation, which the user can usually influence by setting different parameters like the field of view or display aspect ratio. Additionally, information needed for shading and lighting object (e.g., normals, distances to light sources, texture coordinates) are also calculated in the geometry stage of the rendering pipeline. These transformations and other attributes are computed for each vertex (i.e., corner point of a triangle or other shape) in the scene. These values are then interpolated for each pixel that is actually rendered to the screen, without being recomputed for each fragment.

Next (i.e., geometry state → rasterization stage), the two-dimensional geometry is mapped to the discrete pixel positions on the screen. This process known as rasterization. Each point of the resulting image contains such information as color and depth. Thus, rasterizing a primitive includes two parts. The first part is to determine which rectangles of an integer grid in window coordinates are occupied by the primitive. The second part is assigning a color, a depth value and a texture coordinate to each such rectangle, or pixel (also referred to as fragment). The results of this process are then passed on to the next stage of the pipeline (not shown in FIG. 1). For each fragment, the final color value can now be computed from the available data and written to the appropriate location in the frame buffer. The most basic operations include shading, lighting and texturing but can be extended to very complex visual effects.

Figure 2:
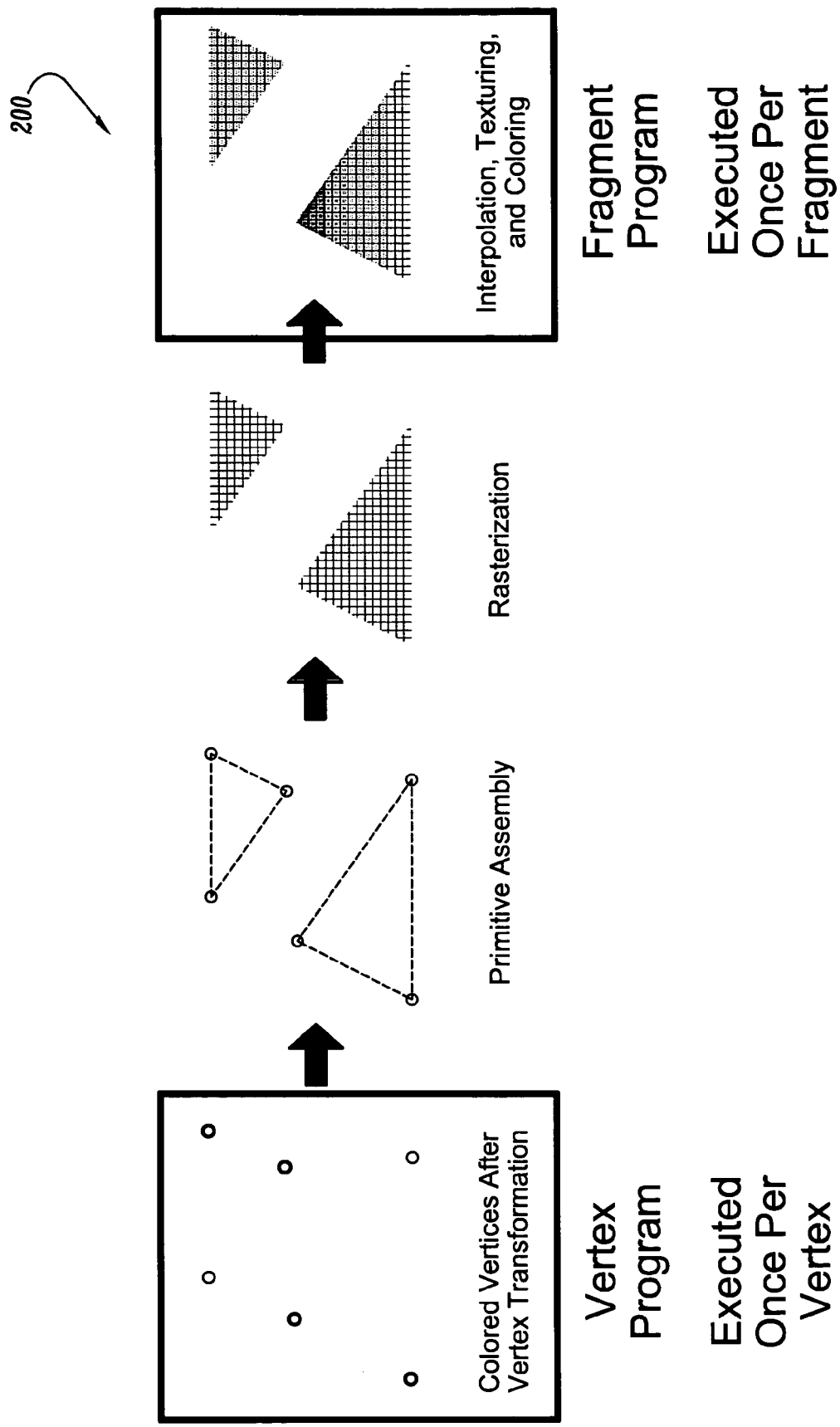
FIG. 2 depicts an exemplary programmable rendering pipeline of a GPU.

Classic rendering pipelines offered a fixed functionality, merely allowing the user to set various parameters and enable or disable certain effects, such as lighting. With the high increase of performance and new capabilities of more modern GPUs, such an inflexible layout has become inadequate, not allowing graphics programmers to make full use of the hardware's features. As a consequence, graphics card manufacturers have designed programmable rendering pipelines, allowing the user to replace the otherwise fixed functionality of the vertex and fragment shading engines with custom code, thereby allowing for a virtually unlimited number of visual effects to be implemented. An exemplary programmable rendering pipeline 200 is shown in FIG. 2.

While CPUs are typically designed to execute program code made up of sequential instructions, GPUs are typically used in a completely different environment. In computer graphics, the various elements, such as vertices or pixels, are independent from one another, thereby allowing for highly parallelized computation. Hence, graphics boards have several pipelines for vertex and fragment processing, while the number of fragment units is usually larger due to the realistic assumption that the number of vertices in a scene will usually be much lower than the number of pixels. For example, the NVIDIA® Geforce 6 Series GPU has 16 separate pixel pipelines (but only 6 vertex pipelines), each pixel pipeline being capable of performing 8 pixel shading operations per clock cycle, leading to a total of 128 per-fragment operations that can be computed in a single clock.

While graphics processors offer many interesting features like parallel computation and very high memory bandwidth and gigaflop counts, it is important to note that they are specialized processors designed for graphics. Therefore, the entire programming environment for graphics processors differs from that of classic software, not allowing for direct porting to the GPU of code written for the CPU. The programming model for graphics processors is tuned for graphics and not intended for general purpose applications, imposing several restrictions. These restrictions may vary across different programming languages and hardware platforms; however, some of them may result directly from the kind of application for which GPUs are designed. First, parameters passed to vertex and fragment shaders represent elements related to the rendering process (e.g., transformation matrices or texture objects) which exist on the GPU. That is, the programmer cannot pass an arbitrary parameter to a shader, and the shader cannot write data to a parameter it receives. There is an exception to the above for the case where the parameter is the same for every invocation of the shader (i.e., every fragment). In this case, the application developer can pass a so-called uniform parameter. Second, the CPU cannot directly access shaders' return values, since those are passed to the next step in the rendering pipeline. That is, the vertex unit passes the result on to the rasterizer, which makes the result available to the fragment unit for updating the output buffer. A user can choose the stage of the pipeline to which the output is written (e.g., the user can choose between the depth buffer and the frame buffer (or both) when computing a fragment). Third, the vertex and fragment engines are designed to work independently and in parallel, so there is no possibility for sharing data between units, either by using global variables or message passing. This also implies that a shader cannot write values to one of its input parameters (e.g., a vertex shader cannot modify a geometry transformation matrix, and a fragment shader cannot write to a texture object). Furthermore, restrictions may apply to the available data types (e.g., there are no pointers available on the GPU), available language constructs (e.g., conditional statements, loops, recursive function calls) or a maximum number of instructions per vertex or fragment program. It should that these and other restrictions may greatly vary depending on the hardware and programming language used.

Computer graphics make extensive use of vectors and matrices. GPUs provide direct hardware support for such data types and can compute operations with vectors of up to four elements. That is, by properly vectorizing the code, a speedup of factor four can theoretically be achieved. It is important to note that shading language compilers do perform vectorization (along with other optimizations). Thus, before an application can be ported from a CPU to a GPU, one must first identify some kind of analogy between the respective application and the graphics rendering process, matching input to geometry and texture elements, output to the various buffers and adapting the computational steps to the capabilities of the vertex and fragment shading units.

When considering the implementation of custom methods on graphics hardware, one should be aware that during rendering, there is a certain amount of overhead implied by the rendering pipeline architecture besides executing the programmed fragment and the vertex shaders. While some of the unnecessary operations (i.e., depth testing) can be disabled, others are an integral part of the rendering process. Integral operations include draw-buffer swapping, copying of data from the color-buffer to texture objects, and switching rendering contexts when using auxiliary draw buffers. As all of these operations are independent of the actual computation carried out in the vertex and fragment shading unit, the relevance of the imposed overhead will strongly depend on the complexity of the implemented custom shader functionality. In the case of very simple shaders, most of the time will be spent on operations that are not of direct interest, while more complex shading programs will reduce the percentage of time spent on overhead operations, thereby allowing for a much better exploitation of the GPU's capabilities. Thus, we can expect simple similarity measures (e.g., sum of absolute intensity differences ("SAD"), sum of squared intensity differences ("SSD")) to perform rather poorly when compared to the CPU-implementation, while more complex measures (e.g., pattern intensity ("PI"), local normalized correlation ("LNC")) have the potential for much better speed-up. But even if the computation of the similarity measure itself should not be faster on the GPU, the ability to assess image similarity on the graphics board eliminates the need for the very slow copying of data from the frame buffer to the main system random access memory ("RAM") when generating the digitally reconstructed radiographs ("DRRs") on the video board.

At first, shading programs had to be written using hardware-specific assembler languages, thereby requiring each shader to be separately implemented for each graphics card in the respective assembler language. As an alternative to the inflexible and often tedious assembler programming of the rendering pipeline, a number of high-level shading languages have been developed. Although not so limited, we illustrate the present invention using NVIDIA® Cg and OpenGL Any of a variety of high-level shading languages may be used, as contemplated by those skilled in the art.

To display a 2D image on the screen using OpenGL, the most simple way is to render a view-aligned quad spanning over the entire viewport area and to apply the image as a texture. As we are dealing with intensity-based registration, all of our operations will be performed on the values stored within the texture object (i.e., in the fragment shading stage of the rendering pipeline), which means that every single operation implied by the respective similarity measure will be carried out for each individual pixel. In the case of measures using spatial information, this also implies that we compute the texture coordinates of each regarded fragment, relative to the current position, in each fragment shader. However, because this process of running through a neighborhood of an a-priori known, and fixed, size is identical for each pixel, it makes much more sense to complete it in the vertex shader.

Texture coordinates are computed within the vertex shading unit for each vertex (of which we have only four, as we are rendering a quad), and are then interpolated for each pixel within the respective geometric shape (i.e. our view-aligned quad). We can then use the interpolated coordinates of the pixels within our neighborhood in the fragment program, without having to calculate them each time. However, as there are only eight texture coordinate units on the GPU where we can store the vertex shader's output, we can pre-compute at most eight coordinates in this way, leaving the rest to the fragment program. In the case of measures that do not use spatial information (e.g., SAD, normalized cross correlation ("NCC")), one can load an empty vertex shader that simply passes on the four vertices' texture coordinates to the fragment unit, without actually computing anything else. In this way, one can make sure that the GPU will not waste any time carrying out any unnecessary computations for vertex shading, such as normal or lighting computation. However, as we are dealing with only four vertices, the performance increase obtained through this method will not be noticeable in practice.

It should be noted that accessing texture data is generally slower than performing mathematical operations. Therefore, shaders performing complex operations on a small number of texture pixels will perform better than those implementing a very simple functionality. As some of the presented similarity measures require performing computation on a rather large block around any pixel in the images, the GPU's fragment shading unit will spend a considerable amount of time on fetching texture data rather than executing program code.

Graphics hardware is designed to compute color intensities meant to be displayed on a screen (i.e., light intensities for different color channels). These intensities are represented by values in the range [0 . . . 1]. That is, all values outside of these limits will be clamped to the respective bound, as they obviously do not represent meaningful intensities. This means that, while negative values can be used inside shader program, they cannot be written to the color buffer. Since many similarity measures do produce negative values, some workaround is required.

A first possibility would be to normalize all values to the [−1 . . . 1] interval and then shift them to [0 . . . 1] by applying a $0.5 \cdot (x+1)$ scheme. As traditional color buffers offer only 8-bit accuracy (i.e., 256 values spanning the [0 . . . 1] range), this approach of interval compaction would only leave 7 bits of accuracy, which is likely too low.

Another possibility is to use two color channels for storing values that might be negative as well as positive. For example, one can store the unmodified value in the red channel and the negated value in the green channel: R=x, G=−x. That is, one channel will always be zero (if x>0, the green channel, and if x<0, the red channel) while the other channel contains the absolute value. To reassemble our actual number inside a shading program or on the CPU, we can compute x=R−G. While this method does not impose any loss of accuracy, it occupies two of the four available color channels, further reducing the number of output values that we can compute within a shader. However, in the case of the measures implemented herein, the four RGBA channels prove sufficient for this method.

Yet another solution is to use a 16 (or 32) bit floating-point buffer for rendering instead of a classical 8-bit buffer. However, as floating-point values do not represent meaningful color intensities, the contents of such buffers cannot be directly displayed on the screen, which also implies that one cannot simply configure the standard frame-buffer to offer floating-point precision. The creation and usage of such off-screen rendering buffers are described in greater detail below.

Gradient values can be up to four times larger than the original image intensities. The fixed image's gradient will be stored as a texture that can contain only values between 0 and 1, which also is the range of the original intensities. The intuitively best possibility to accommodate the gradient's data range would be to divide it by 4, possibly multiplying it again by 4 when assessing the similarity between the precomputed fixed gradient and the moving gradient (which is not stored within a texture object but computed within the fragment shading unit, where no such data range restrictions apply).

Although mathematically incorrect, another possibility is to simply ignore the problem. All values greater than the maximum representable intensity automatically get clamped to 1 when written to an 8-bit frame buffer. When computing the moving image's gradient, one would thus have to clamp the result to the same data range as well to make sure that the two images' gradient values correspond. However, this may result in a slightly smaller registration accuracy, while clamping the fixed gradient but leaving the other gradient unchanged, seems to deliver better results.

Using fragment shaders, the GPU computes a two-dimensional image holding a measure of similarity for each pixel location. Because we need one single value denoting the image similarity, it follows that we need to find a way of computing this single value from the individual pixel intensities. This involves obtaining the average of intensities, or their sum, for the individual color channels, which can already be the required measure (e.g., in the case of measures based on a difference image) or which can represent different factors in the final formula (e.g., in the case of the correlation coefficient).

CPU averaging: One approach for solving this problem is to simply copy the whole image from video memory into the system's RAM and compute the average value on the CPU. However, this solution, although delivering very accurate results, contradicts our intention of eliminating the slow copying of data between the RAM and the GPU.

Figure 3:
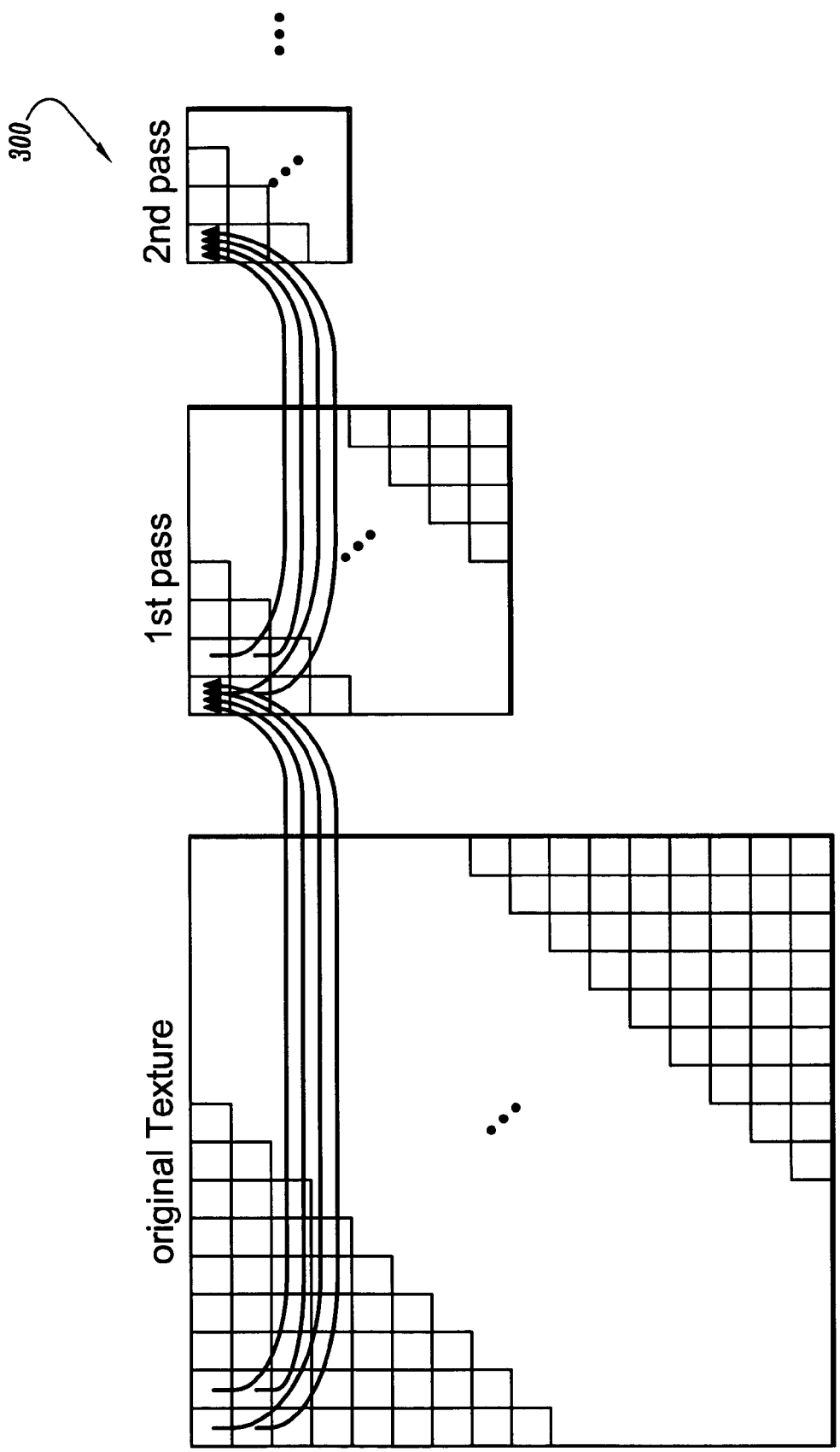
FIG. 3 depicts an exemplary mipmap generation.

Mipmaps: A GPU-based solution for averaging an image's contents is provided by mipmaps. Mipmaps represent scaled down versions of a texture image, each mipmap having half the width and height of the previous one (note that the original image must have power of two values for width and height). Thus, from a 32×32 image, we can recursively generate 16×16, 8×8, 4×4, 2×2 and 1×1 pixel mipmaps by computing each pixel as the average of four input pixels. An exemplary mipmap generation 300 is shown in FIG. 3.

Many modern video boards, like the NVIDIA® Geforce GPUs, support the SGIS_generate_mipmap OpenGL extension which enables the automatic generation of mipmaps for a texture object as soon as its contents change (e.g., when a glCopyTexImage( . . . ) is executed). This method is much faster than the first approach (on a system containing an AMD Athlon XP 1800+CPU and a Geforce FX 5200 GPU, the time for averaging a 256×256 image was 7.9 ms on the CPU and 1.8 ms using mipmaps), but is in turn less accurate. This is due to the repeated rounding involved in mipmap generation: computing all mipmaps for a 256×256 image involves 8 steps, where in each step 4 pixel intensities are being averaged into one output value. The value will be rounded up to the next higher integer value (assuming 0 . . . 255 intensities). This repeated rounding, combined with the fact that we only have 8-bit accuracy, can lead to a result far from the actual average value. With the number of mipmapping steps being n=$\log_2$ (imagesize), we have: $AVG_{SGIS} < n*0.75 + AVG_{real}$. On Geforce FX boards, this automatic mipmap generation is only available for 8-bit textures, since 16 or 32-bit textures are assumed to be of type NV_TEXTURE_RECTANGLE (instead of GL_TEXTURE_2D), which is not restricted to power-of-two dimensions. The newer Geforce 6 boards also support automatic mipmap generation for floating-point textures, where the error accumulated through repeated rounding will also be much smaller due to the higher 16 or even 32-bit accuracy.

It should be noted that the 1×1 mipmap remains black (although this may also vary depending on hardware and driver version), so one has to use the 2×2 image. However, this only implies the copying of 3 additional pixel values (with 4 bytes for each of them, assuming 8-bit RGBA texture format) which has no noticeable impact on performance.

As an alternative to this method, we could also use a custom fragment shader to execute the averaging. However, this proves to be even slower than processing everything on the CPU, since it requires $\log_2$ (imagesize) processing steps (8 for the 256×256 px images commonly used in our application), each one involving the rendering of the previously generated mipmap and copying the result to a texture object to be used for the next step.

Also, this approach can reduce the maximum rounding error made in each mipmap generation step from 0.75 to 0.5 (because we can decide whether we will round up or down instead of always rounding up as is the case with the automatic mipmap generation). This, combined with the slow performance, makes this option for average computation an unattractive one.

Pbuffers (i.e., pixel buffers) are off-screen render buffers that support 8, 16 or 32 bits per color channel and that can also be bound to texture objects and used like a normal texture without the need for copying any data. Each pbuffer is a separate device context and OpenGL rendering context, so switching between the frame buffer and a pbuffer implies a certain overhead. It should be noted here that in Microsoft® DirectX, a pbuffer is simply a color buffer, so switching the rendering target will be much faster there.

Creation and usage of such buffers require various hardware and OS-specific extensions: (1) For Windows: WGL_ARB_pbuffer, WGL_ARB_pixel_format, WGL_ARB_render_texture; and (2) For Unix: GLX_ARB_pbuffer, GLK_ARB_pixel_format, GLK_ARB_render_texture.

Usage: A pbuffer is created and initialized prior to use. Set the pbuffer as current rendering context

| Windows OS | Unix OS |
|---|---|
| wglMakeCurrent(pbuf_hDC, pbuf_hRC) | glXMakeCurrent(m_pDisplay, m_glxPbuffer, m_glxContext) |

Go back to the main rendering context and then bind the pbuffer to a texture object (possible under Windows): glBindTexture(GL_TEXTURE_2D, texobj); wglBindTexImageARB(hBuf, WGL_FRONT_LEFT_ARB); or

| Windows OS | Unix OS |
|---|---|
| wglMakeCurrent(main_hDC, main_hRC) | glXMakeCurrent(m_pDisplay, m_glxPbuffer, m_glxContext) |

Copy the pbuffer's content to a texture object, then switch back to the main context:

| Windows OS | Unix OS |
|---|---|
| glBindTexture(GL_TEXTURE_2D, texobj) glCopyTexSubImage2D(GL_TEXTURE_2D, ...) wglMakeCurrent(main_hDC,main_hRC)glXMakeCurrent(m_pDisplay, m_glxPbuffer, m_glxContext) | |

Creating a pbuffer: Creating a pbuffer can be rather tedious, so building a reusable class is generally a good idea.

First, one should save the main device and rendering contexts, so one can switch back to them after rendering is complete.

| Windows OS | Unix OS |
| --- | --- |
| HDC mainDC = wglGetCurrentDC( );<br>HGLRC mainRC = wglGetCurrentContext( ); | Display *m_pMainDisplay = glXGetCurrentDisplay( );<br>GLXPbuffer m_glxMainDrawable = glXGetCurrentDrawable( );<br>GLXContext m_glxMainContext = glXGetCurrentContext( ); |

Then, two lists of pbuffer attributes must be set: one list for the buffer's pixel format and one for the pbuffer itself. This will be explained in more detail below. Once the pbuffer attributes have been set, an appropriate pixel format can be obtained by calling:

| Windows OS | Unix OS |
| --- | --- |
| wglChoosePixelFormatARB(mainDC,<br>&pfAttribList[0], NULL,<br>MAX_PFORMATS, pformats,<br>&iformats);<br>//pfAttrbisList contains the pixel format attributes<br>//MAX_PFORMATS gives the length of the pformats array (1 is enough)<br>//pformats is an integer array in which the available pixel formats will be stored<br>//iformats is the number of available pixel formats | Display *pDisplay = glXGetCurrentDisplay( );<br>int iScreen = DefaultScreen(pDisplay);<br>GLXFBConfig * glxConfig = glXChooseFBConfigSGIX(pDisplay, iScreen, &pfAttribList[0], &iformats);<br>//pfAttrbisList contains the pixel format attributes<br>//glxConfig is a pointer to an array containing iformats pixel formats |

If there are any pixel formats available, you can create your pbuffer and get the other necessary handles.

| Windows OS | Unix OS |
| --- | --- |
| HPBUFFERARB hBuf = wglCreatePbufferARB(mainDC, pformats[0], m_width, m_height, &pbAttribList[0]);)<br>HDC m_hDC = wglGetPbufferDCARB(hBuf);<br>HGLRC m_hRC = wglCreateContext(hDC); | glxPbuffer m_glxPbuffer = glXCreateGLXPbufferSGIX(pDispla glxConfig[0], m_width, m_height, &pbAttribList[0]);<br>GLXContext m_glxContext = glXCreateContextWithConfigSGIX( glXGetCurrentDisplay( ), glxConfig[0], GLX_RGBA_TYPE, glXGetCurrentContext( ), true);<br>Display *m_pDisplay = glXGetCurrentDisplay( ); |

Because pbuffers represent a separate rendering context, the texture objects, display lists and shader programs from the main context are not available while rendering to the pbuffer. However, all those things can be shared across the two contexts. On the Windows operating system ("OS"), this can be achieved by calling wglShareLists(mainRC, m_hRC) immediately after creating the pbuffer. Under Unix, the function glXCreateContextWithConfigSGIX( . . . ) takes care of sharing these elements with the context it gets as parameter (glXGetCurrentContext( ) in the upper example).

Choosing a pixel format: It should be noted that pfAttribList represents the pixel's format attributes and pbAttribList the buffer's format attributes. Both attribute arrays comprise of pairs of values, where the first attribute array (a WGL or GLX constant) indicates the respective attribute, while the second attribute array represents the desired value for the specified attribute. A value of zero indicates the end of the list.

The following are settings for an exemplary implementation, offer a general guideline on setting up pbuffers. Other settings may be used, as contemplated by those skilled in the art. It is important to note that some attributes explicitly require, or exclude, the setting of other attributes. Detailed information on such restrictions can be found in SGI's® OpenGL Extension Registry and in NVIDIA's® and ATI's® extensions specifications. Apart from this well-specified relationship between attributes, certain attributes may have a severe impact on the pbuffer's performance regarding functionality not directly related to the respective attribute. These problems might be related to driver issues, so one should best carry out some experiments with different pbuffer configurations to determine its behavior on the actual target system.

Basic Attributes

| Windows OS | Unix OS |
| --- | --- |
| pfAttribList.push_back (WGL_DRAW_TO_PBUFFER_ARB);<br>pfAttribList.push_back(true); | pfAttribList.push_back (GLX_DRAWABLE_TYPE);<br>pfAttribList.push_back (GLX_PBUFFER_BIT); |
| pfAttribList.push_back (WGL_SUPPORT_OPENGL_ARB);<br>pfAttribList.push_back(true); | pfAttribList.push_back (GLX_RENDER_TYPE);<br>pfAttribList.push_back (GLX_RGBA_BIT); |
| pbAttribList.push_back (WGL_PBUFFER_LARGEST_ARB);<br>pbAttribList.push_back(false);<br>//if set to 'true', you will get the largest pbuffer available, which might be smaller than the size required | pbAttribList.push_back (GLX_LARGEST_PBUFFER);<br>pbAttribList.push_back(false);<br>pbAttribList.push_back (GLX_PRESERVED_CONTENTS);<br>pbAttribList.push_back(true); |

Precision Attributes

| Windows OS | Unix OS |
|---|---|
| pfAttribList.push_back (WGL_RED_BITS_ARB); pfAttribList.push_back (color_bits); pfAttribList.push_back (WGL_GREEN_BITS_ARB); pfAttribList.push_back (color_bits); pfAttribList.push_back (WGL_BLUE_BITS_ARB); pfAttribList.push_back (color_bits); pfAttribList.push_back (WGL_ALPHA_BITS_ARB); pfAttribList.push_back (alpha_bits); pfAttribList.push_back (WGL_DEPTH_BITS_ARB); pfAttribList.push_back (depth_bits); | pfAttribList.push_back (GLX_RED_SIZE); pfAttribList.push_back (color_bits); pfAttribList.push_back (GLX_GREEN_SIZE); pfAttribList.push_back (color_bits); pfAttribList.push_back (GLX_BLUE_SIZE); pfAttribList.push_back (color_bits); pfAttrbList.push_back (GLX_ALPHA_SIZE); pfAttribList.push_back (alpha_bits); pfAttribList.push_back (GLX_DEPTH_SIZE); pfAttribList.push_back (depth_bits); |

If one needs more than 8 color bits per channel and uses an NVIDIA® GPU, the pbuffer's components must be of floating-point type.

| Windows OS | Unix OS |
|---|---|
| pfAttribList.push_back (WGL_FLOAT_COMPONENTS_NV); pfAttribList.push_back(true); | pfAttribList.push_back (GLX_FLOAT_COMPONENTS_NV); pfAttribList.push_back(true); |

ATI® GPUs also support 16-bit fixed-point values, but in case one requires floats, the following attributes can be set instead of the above:

| Windows OS | Unix OS |
|---|---|
| pfAttribList.push_back (WGL_PIXEL_TYPE_ARB); pfAttribList.push_back (WGL_TYPE_RGBA_FLOAT_ATI); | not supported not supported |

Texture Binding Attributes:

```
//8 bit pbuffer
    pfAttribList.push_back(WGL_BIND_TO_TEXTURE_RGBA_ARB);
    pfAttribList.push_back(true);
    pbAttribList.push_back(WGL_TEXTURE_TARGET_ARB);
    pbAttribList.push_back(WGL_TEXTURE_2D_ARB);
    pbAttribList.push_back(WGL_TEXTURE_FORMAT_ARB);
    pbAttribList.push_back(WGL_TEXTURE_RGBA_ARB);
//16 or 32-bit pbuffer
    pfAttribList.push_back(WGL_BIND_TO_TEXTURE_RECTANGLE_FLOAT_RGBA_NV);
    pfAttribList.push_back(true);
    pbAttribList.push_back(WGL_TEXTURE_TARGET_ARB);
    pbAttribList.push_back(WGL_TEXTURE_RECTANGLE_NV);
    pbAttribList.push_back(WGL_TEXTURE_FORMAT_ARB);
    pbAttribList.push_back(WGL_TEXTURE_FLOAT_RGBA_NV);
```

Binding a pbuffer to a texture object: Pbuffers have the ability to be bound to a previously created texture object and be used directly as textures, without the need for copying any data from rendering buffer to texture. However, this method may not be a good choice due to the following issues:

1. It is slower than copying the pbuffer contents to the texture object using glCopyTexSubImage2D( . . . ).

2. It makes the pbuffer extremely slow if you want to use glCopyTexSubImage2D( . . . ) with it (besides binding).

3. It does not allow you to bind the pbuffer to a texture object with automatic mipmap computation turned on (glTexParameteri(GL_TEXTURE_2D, GL_GENERATE_MIPMAP_SGIS, GL_TRUE)). According to NVIDIA® whitepapers, using pfAttribList.push_back(WGL-MIPMAP_TEXTURE_ARB); pfAttribList.push_back(true); as pixel format attributes should allow for such binding; however, the system does not provide a suitable pixel format for such a pbuffer, at least not on Geforce FX graphics boards. Therefore, to compute mipmaps for the image in a pbuffer, glCopyTexSubImage2D( ) from the pbuffer to a texture object, which can result in a significant performance drop.

Figure 4:
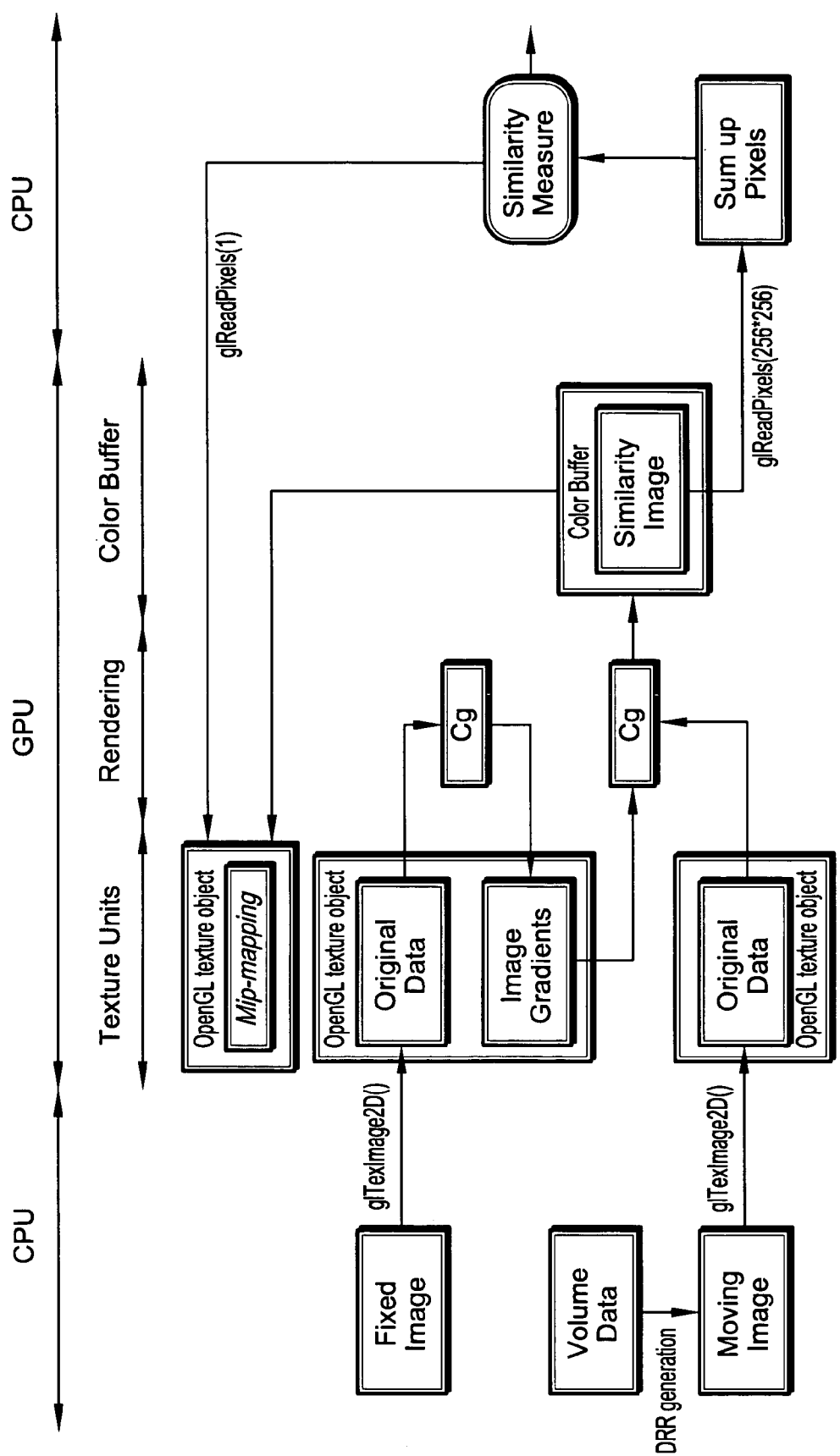
FIG. 4 depicts a GPU-based method for 2D/3D registration (including CPU-based DRR generation) with a gradient-based similarity measure, in accordance with one exemplary embodiment of the present invention.

During the registration process, we successively apply new transformations to one of the images, leaving the other one unchanged, until a best match is found. We term the images "moving image" and "fixed image," respectively. With general reference to FIG. 4, the basic GPU-based method for comparing two images works as follows:

1. Store the fixed image on the GPU using a texture object with four color channels (i.e., RGBA texture). Because we are registering grayscale images, only the red channel is actually required for the image data, allowing the other three channels to be used otherwise.

2. If any values that go into the final similarity measure formula can be pre-computed from the fixed image alone, as is the case for gradients or the mean intensity, then:

load the corresponding fragment shader and set its parameters (these contain the fixed texture object and any other necessary values),
render the image to a pbuffer,
copy the result back into the texture object.

It should be noted that this step should be performed only once for the whole registration process. Thus, all operations that are independent of the moving image should be performed here. Pbuffers are off-screen render buffers with special properties that the regular frame-buffer does not have and are explained in greater detail above.

3. Store the moving image as a RGBA texture object. The image data can either be uploaded to the GPU from the system RAM or be directly generated on the video card. The latter will usually be the case when the volume rendering methods for the DRR generation are also implemented in hardware. Again, only the red channel initially contains image data.

4. To evaluate the similarity measure:
load the fragment shader that will assess the desired similarity measure in each pixel location,
render to the frame-buffer or a pbuffer,
from the resulting image, which is termed herein as similarity image, compute the actual measure, which is a single value.

While all other steps perfectly fit the architecture and design of the rendering pipeline (i.e., feed it geometry and textures and obtain a two-dimensional array of RGBA pixels), the last step is of a different nature, as summing up the pixel values stored in a texture is not a typical graphics application. Two solutions to this issue are described in greater detail above.

Measures such as SAD and SSD, which do not require any data except the original image intensities at the respective location, are very easily implemented as a fragment shader.

The following fragment shader computes the squared difference between the intensities the current pixel location, or texture coordinate, in the fixed and moving image. The code and the subsequent explanation is intended as a very short introduction to the Cg shading language, illustrating the most common constructs and data types.

```
half4 main(half2 texcoord: TEXCOORD0),
    uniform sampler2D image1,
    uniform sampler2D image2): COLOR
{
    half val1 = h4tex2D(image1, texcoord).r;
    half val2 = h4tex2D(image2, texcoord).r;
    return ((val1 - val2) * (val1 - val2)).xxxx;
}
```

The parameter texcoord changes for each drawn fragment and is supplied by the rendering GPU's pipeline. The half data type represents a half-precision (i.e., 16-bit) floating-point value, while the suffix 2 indicates that we are dealing with a two-component vector. The texture parameters image1 and image2 must be set by the user and remain the same for each shaded fragment (i.e., they are uniform parameters). The result will be written to the COLOR-buffer, which stores four values for each pixel, one for each color channel. The function h4tex2D( . . . ) returns a half4 value (i.e., a vector with four half components), containing the RGBA intensities in the given texture object and at the specified coordinate. The components in a half4 can be individually addressed with .r, .g, .b and .a respectively (or .x, .y, .z and .w). As we are working with grayscale images, all the image information is contained in the red channel. After reading the grayscale intensities from the texture objects, we compute the squared sum, which is a single value. Because our main function's return type is half4 (as imposed by the RGBA color-buffer), we can duplicate, or smear, the computed difference into the G, B and A channels at no computational cost.

To further speed up these very simple measures, one could also use all four color channels to store the image intensities (i.e., the first gray-scale image value goes into the first pixel's red channel, the second gray-scale value into the green channel, the third goes into the blue channel, the fourth into the alpha channel, the fifth again into the red channel of the second pixel and so on), which results in a texture only one quarter the size of the original image. Because GPUs are designed to work with 4-component vectors, the fragment shader would compute the 4 squared differences just as fast as the one difference in the example above, which would finally result in a significant performance boost.

The Correlation Coefficient, described above, operates on the original image data, but is nevertheless different from the measures described above as it requires the images' mean intensity values. Two approaches to image averaging are described above. Pre-computing the fixed image's mean is best done using the CPU-based approach, as it is more accurate. As this is performed only once for the whole registration process, the lower speed is also not an issue.

If we were to use the first NCC formula, we would have to repeat this process for each DRR in a separate pass, before computing the Correlation Coefficient. However, using the second NCC formula, we can assess the similarity in a single rendering pass, storing $I_1(x,y) \cdot I_2(x,y)^2$, $I_1(x,y)^2$, $I_2(x,y)^2$ and $I_2(x,y)$ in the RGBA color channels. To take advantage of the GPU's vector processing capability within the fragment shader, we can initialize two vectors containing $[I_1(x,y), I_1(x,y), I_2(x,y), 1]$ and $[I_2(x,y), I_1(x,y), I_2(x,y), I_2(x,y)]$. By these two vectors, we can compute all the four terms with a single operation. This also means that pre-computing the term, which depends only on the fixed image ($\Sigma I_1(x,y)^2 - n \cdot \bar{I}_1^2$), will not yield any performance improvement as both the product and the summation (i.e., mip-mapping the respective color channel) will be carried out anyway.

After obtaining the average intensity of each channel, we can assemble the NCC as follows (where $\bar{I}_1$ is the pre-computed fixed image mean intensity).

$$NCC = \frac{\bar{R} - \bar{I}_1 \cdot \bar{A}}{\sqrt{\bar{G} \cdot \bar{I}_1^2} \cdot \sqrt{\bar{B} - \bar{A}^2}}$$

Figure 5:
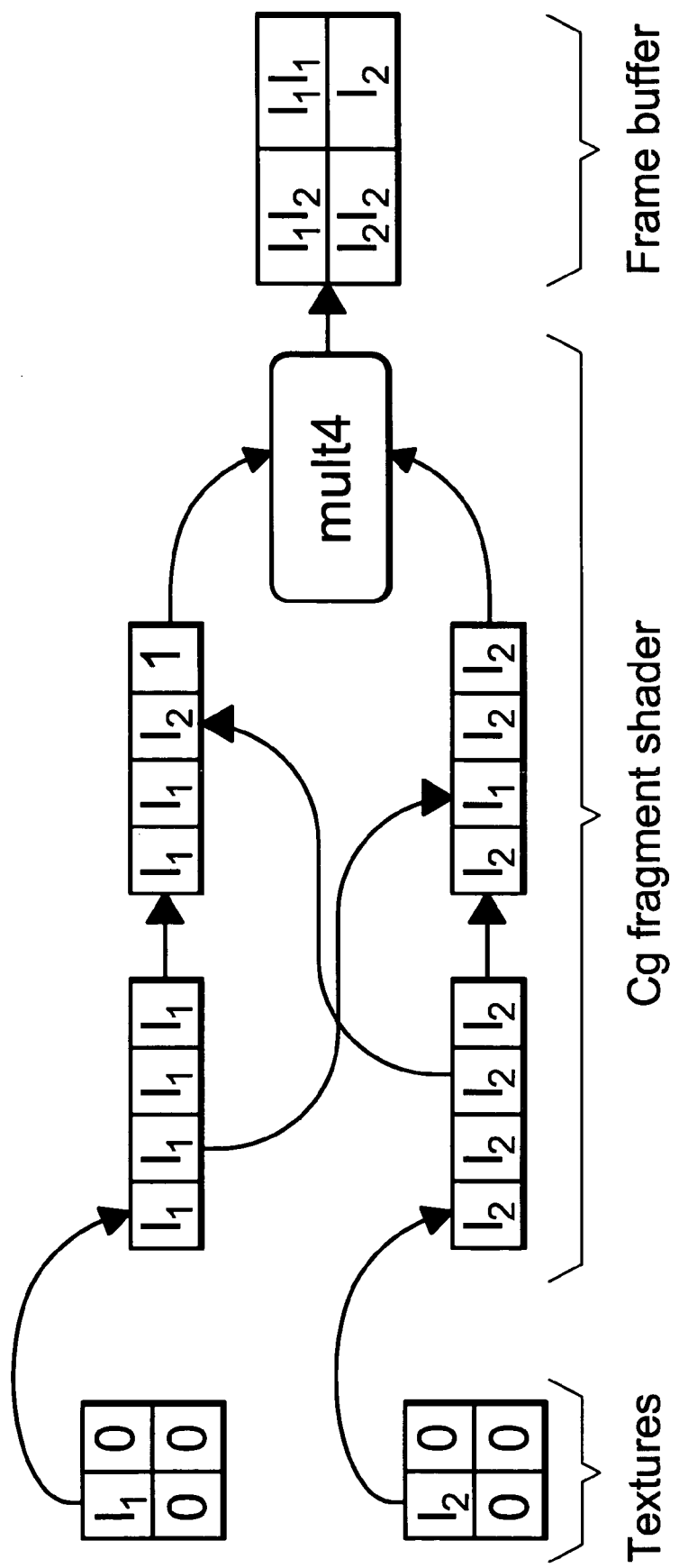
FIG. 5 depicts a normalized cross correlation on a GPU, in accordance with one exemplary embodiment of the present invention.

An exemplary normalized cross correlation on the GPU is shown in FIG. 5.

Although the pattern intensity measure regards only the original image intensities, like SAD and SSD, it operates on a whole neighborhood rather than an individual fragment. Because the neighborhood is not square, running through it by means of two nested for-loops would force checking each time whether the respective coordinate is inside the region of interest. Hence, it is the more efficient to address the neighboring pixels individually, without using any loop constructs, which would be unrolled by the Cg compiler.

As described above, we can pre-compute the texture coordinates of eight neighboring pixels in the vertex shading unit, thereby reducing the complexity of the fragment shader. By writing explicit code for each pixel, there is also no need to check whether the respective texture coordinate has already been computed in the vertex stage or not.

Gradient-based methods comprise two main steps: (1) computing the gradient of the original image; and (2) assessing the similarity between the two gradient images. Obviously, it is enough if we compute the fixed image's gradient only once and use that information for the whole registration process. In the case of the DRR, however, the gradient must be computed again with each new pose.

As gradients can also have negative values, two color channels will be needed for each pixel, as described in greater detail above. With all the three gradient-based measures requiring both the vertical and horizontal image gradients, all the four color channels available in a RGBA texture are necessary to store all the data.

As the presented gradient-based measures only examine the gradient value at the respective pixel position, it is possible to pack the DRR gradient computation and the actual measure into a single fragment shader that takes the fixed image's gradient and the original DRR as parameters. This approach is faster than computing the moving image's gradient separately, as it eliminates the overhead of a second rendering pass, with the necessary OpenGL context switch and copying of data from the color buffer to a texture object.

After pre-computing the fixed image's gradient and its mean intensity, the Gradient Correlation Coefficient can be obtained by using a fragment shader that computes both the gradient value in the DRR at the respective position, and the other three terms making up the NCC formula. However, the GC is obtained as the average of two NCC's, namely between the horizontal gradients and the vertical ones. Thus, GC cannot be computed in a single rendering pass, because there are not enough output locations available. In a second pass, one can use a modified fragment shader that will compute the vertical gradient instead of the horizontal one and correlate it with the corresponding fixed gradient values.

A number of modern GPUs (e.g., NVIDIA® Geforce 6) allow one to write to multiple color buffers at the same time. This feature is known as multiple render targets ("MRT"). That is, by using two color buffers we can complete both vertical and horizontal gradient correlation computations in a single rendering pass. But because the main two time-consuming factors (i.e., the fragment shading operations and the similarity image averaging) are not reduced by using MRT, in this case both approaches result in the same execution speed. Therefore, to maintain compatibility with older hardware, such as the Geforce FX series, we do not use multiple render targets in this exemplary implementation.

Unlike Gradient Correlation, the Gradient Difference measure can be easily computed in a single rendering pass. Both measures are obtained as a single sum over all pixels, so only one color channel will contain useful information at the end of the computation.

The Sum of Local Normalized Correlation can be computed in two ways: (1) one way for overlapping sub-images; and (2) another way for non-overlapping subimages. The second case would imply that we are computing the measure at some pixel locations (usually the center or a corner of each sub-image), but not at others. However, as the Shading Standard 2.0 supported by NVIDIA® Geforce FX boards does not allow fragment programs to contain conditional return statements, one cannot decide within the fragment shading step whether the LNC will be computed or not. Therefore, a straightforward possibility is to compute the local correlation coefficient for sub-images centered around each pixel, which is obviously quite expensive, resulting in a slow measure. A way of computing the correlation coefficients for non-overlapping images would be to store a mask inside the depth-, alpha- or stencil-buffer in such a way that only one pixel out of each sub-image would pass the respective test and thus be drawn.

The newer Shading Standard 3.0 which is currently supported only by the NVIDIA® Geforce 6 GPUs does provide much better support for conditional statements, so LNC can be implemented to examine non-overlapping sub-images as well. However, conditional statements are still quite expensive, so the performance gain obtained by using this approach was by far not as large as expected, as the computation was just about 30% faster.

Nevertheless, a considerable part of the final measure can be pre-computed and stored in the green, blue and alpha channels when one sets the fixed image. Therefore, we can precompute the mean of the sub-images in the fixed image and also $\sqrt{\Sigma(I(x,y)-\bar{I})^2}$. For the Variance-Weighted Sum of Local Normalized Correlation, can also pre-compute the sub-images' variances and store it in the remaining color channel.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A system for performing registration applications, the system comprising:
   a graphical processing unit (GPU);
   a central processing unit (CPU) for transferring a plurality of images to the GPU,
   wherein the GPU performs a registration application on two of the plurality of images to generate a registration result indicating a degree of alignment between the two images, wherein the GPU returns the registration result to the CPU,
   wherein the registration application is configured to convert each of the two images to texture objects for combination by a shading unit of the GPU into a similarity image, and
   wherein the registration result is based on the similarity image.

2. The system of claim 1, wherein the registration application comprises at least one of:
   an image warping application;
   a local histogram computation application;
   an intensity correction application; and
   a similarity measure estimation application.

3. The system of claim 2, wherein the similarity measure estimation application comprise one of:
   a sum of squared intensity differences (SSD) application;
   a sum of absolute intensity differences (SAD) application;
   a normalized correlation coefficient (NCC) application;
   a ratio image uniformity (RIU) application; a pattern intensity (PI) application;
   a gradient conversion (GC) application;
   a gradient difference (GD) application;
   a sum of local normalized correlation (SLNC) application;
   a variance-weighted sum of local normalized correlation (VWC) application; and
   a mutual information (MC) application.

4. The system of claim 1, wherein the GPU comprises: a vertex shading unit for computing texture coordinates for each vertex in a geometric shape in the plurality of images, and for interpolating the texture coordinates for each pixel in the geometric shape.

5. The system of claim 1, wherein the GPU comprises:
a negative number handling unit for handling negative numbers in the GPU.

6. The system of claim 1, wherein the GPU comprises:
a gradient value handling unit for handling gradient values in GPU.

7. The system of claim 1, wherein the GPU comprises:
a mipmap unit for averaging contents of the plurality of images.

8. The system of claim 1, wherein the GPU comprises:
a pixel buffer (Pbuffer) comprising an off-screen render buffer.

9. A method for registering images, comprising:
transferring a plurality of images from a central processing unit (CPU) to a graphics processing unit (GPU);
performing a registration application on two of the plurality of images using the GPU to generate a similarity image as a registration result;
transferring the registration result from the GPU to the CPU; and
performing a registration on the two images using the registration result to generate a combined image,
wherein the registration application of the GPU converts positive and negative values of the combined image into a positive equivalent representation for storage in a color buffer of the GPU.

10. The method of claim 9, wherein the step of performing a registration application using the GPU comprises at least one of:
performing an image warping application;
performing a local histogram computation application;
performing an intensity correction application; and
performing a similarity measure estimation application.

11. The method of claim 9, wherein the step of performing a registration application on the plurality of images using GPU, comprises:
reducing the size of the plurality of images; and
performing the registration application on the size-decreased plurality of images.

12. The method of claim 11, wherein the step of reducing the size of the plurality of images, comprises:
generating a plurality of lower-resolution mipmaps based on the plurality of images.

13. The method of claim 12, wherein the step of transferring the registration result from the GPU to CPU, comprises:
transferring the lower-resolution mipmaps from the GPU to the CPU; and
performing averaging operations on the lower-resolution mipmaps.

14. The method of claim 9, wherein the step of performing a registration application using the GPU, comprises:
mapping a number of similarity measures from the CPU to the GPU; and
performing one of the number of similarity measures on the plurality of images using the GPU.

15. The method of claim 14, wherein the step of performing one of the number of similarity measures, comprises one of:
performing sum of absolute intensity differences (SAD);
performing sum of squared intensity differences (SSD);
performing normalized cross correlation (NCC);
performing ratio image uniformity (RIU);
performing pattern intensity (PI);
performing gradient conversion (GC);
performing gradient difference (GD);
performing sum of local normalized correlation (SLNC);
performing variance-weighted sum of local normalized correlation (VWC); and
performing mutual information (MC).

16. The method of claim 9, wherein the step of transferring the registration result from the GPU to CPU, comprises:
transferring the registration result from an offline P-buffer to the CPU.

17. The method of claim 16, wherein the step of transferring the registration result from an offline P-buffer to the CPU, comprises:
rendering slices of the result of the step of performing;
transferring the slices from the offline P-buffer to the CPU; and
arranging the slices together to form a resulting image.

18. The method of claim 9, wherein the step of performing a registration application on the plurality of images using the GPU, comprises:
performing a registration application on the plurality of images using the GPU in parallel with using the CPU.

19. The method of claim 9, wherein the step of transferring a plurality of images from a central processing unit (CPU) to a graphics processing unit (GPU) comprises:
transferring a plurality of images from the CPU to a texture buffer of the GPU.

20. A program storage device readable by a machine, tangibly embodying a program of instructions executable on the machine to perform method steps for registering images, the method comprising the steps of:
transferring a plurality of images from a central processing unit (CPU) to a graphics processing unit (GPU);
performing a registration application on two of the plurality of images using the GPU to generate a registration result indicating a degree of alignment between the images; and
transferring the registration result from the GPU to CPU,
wherein the registration application is configured to convert each of the two images to texture objects for combination by a shading unit of the GPU into a similarity image, and
wherein the registration result is based on the similarity image.

* * * * *